United States Patent [19]

Berman

[11] Patent Number: 4,793,553

[45] Date of Patent: Dec. 27, 1988

[54] INFRARED THERMOSTAT CONTROL

[76] Inventor: Herbert L. Berman, 12680 Viscaino Rd., Los Altos, Calif. 94022

[21] Appl. No.: 319,273

[22] Filed: Nov. 9, 1981

[51] Int. Cl.[4] .................. G01K 17/00; G05D 23/00
[52] U.S. Cl. .................................. 236/91 R; 374/29
[58] Field of Search ............... 236/91 R, 91 G, 91 D, 236/1 R; 374/29, 30

[56] References Cited

U.S. PATENT DOCUMENTS

| | | | |
|---|---|---|---|
| 2,246,575 | 6/1941 | Coleman | 374/30 X |
| 3,952,947 | 4/1976 | Saunders | 236/49 X |
| 4,274,475 | 6/1981 | Rall et al. | 374/29 X |

Primary Examiner—William E. Wayner
Attorney, Agent, or Firm—Don B. Finkelstein

[57] ABSTRACT

A system for automatically controlling heating and air conditioning equipment that make up the environmental control system in a building. The system measures heat flow into and out of the building by means of an infrared sensor mounted on an inner wall and directed toward an outer wall or window. In the winter the system logic monitors the ambient temperature and if sufficient heat flow is present to allow the incoming thermo energy to heat the internal environment to the desired set point, the system directs the shut off of the furnace. In summer the system logic decides when the heat flow has decreased to a point that the air conditioning equipment can be shut down. An adjustable time delay is response to heat flow is used to compensate for rapid changes in heat flow experienced during partially cloudy days.

7 Claims, 2 Drawing Sheets

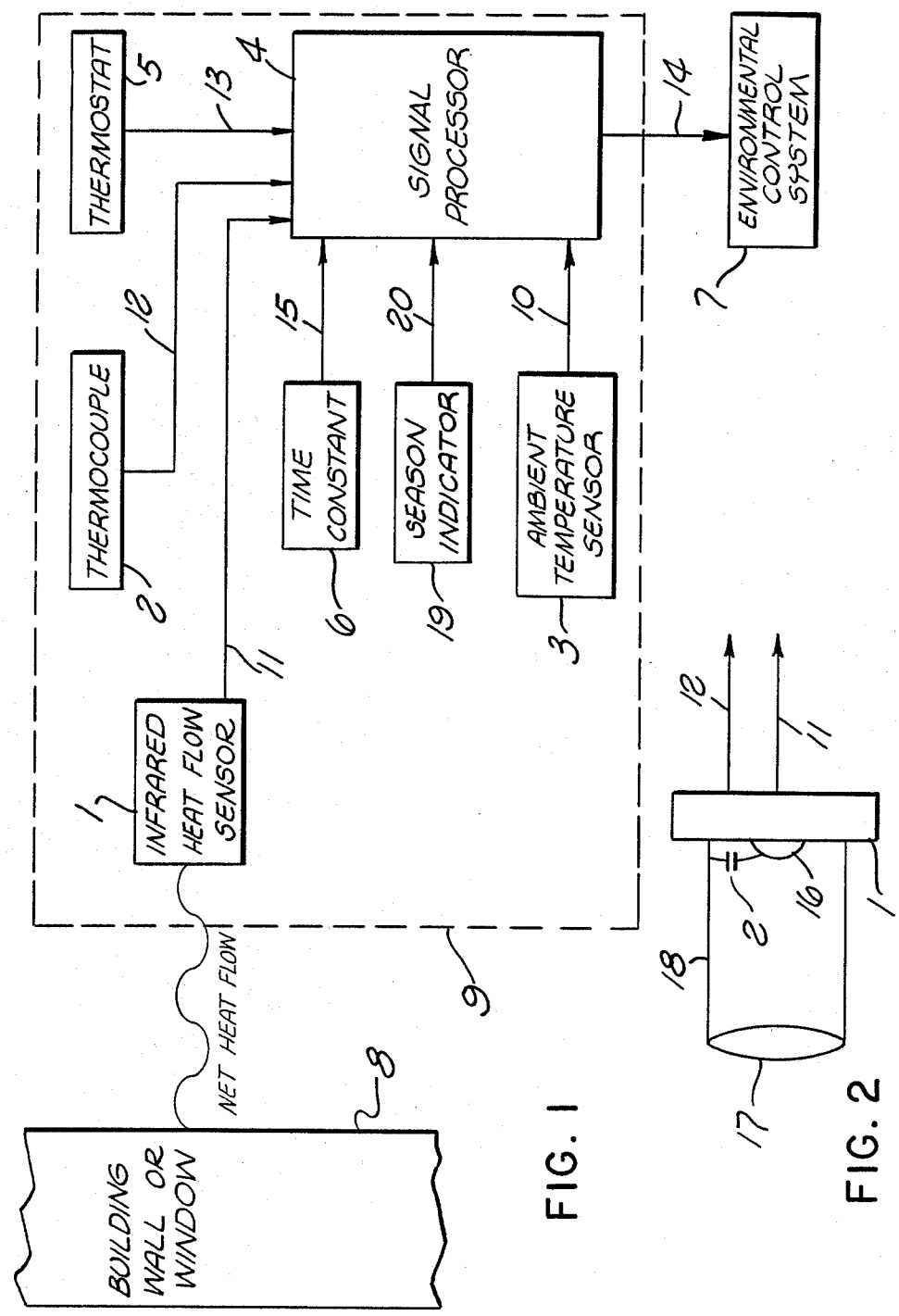

INFRARED THERMOSTAT CONTROL

BACKGROUND OF THE INVENTION

Most conventional thermostatic control systems monitor room temperature to determine when to actuate or deactuate heater power. After sunrise, heat flows into a building due to solar loading and the total amount of heat flow is influenced by increasing outdoor temperature. These systems do not account for the influence of radiant and conductive heat flow through outside walls and windows on room temperature. Therefore, the building furnace may be providing heat despite the thermal energy entering the building. This defect in existing thermostat systems results in excessive furnace "on time" because the furnace could be shut off earlier as the entering thermal energy will continue to raise the internal temperature to the desired threshold level. Instead the furnace stays on until the threshold level is reached. The entering thermal energy continues to heat the room after the threshold level is reached causing room temperature "overshoot".

SUMMARY OF THE INVENTION

This invention relates in general to the control of heating and air conditioning equipment that make up environmental control systems.

The method of thermostat control employed by this invention is readily adapted to buildings or enclosures employing thermostatic control of existing environmental control systems.

The present invention measures the radiant and conductive heat flow from outer walls and windows into and out of the building. This heat flow is measured by means of an infrared sensor mounted on an inner wall and directed toward an outer wall or window.

The advantage of the Infrared Thermostat Control is that it monitors this heat flow and will anticipate or predict when the entering thermal energy can be used to attain the desired threshold level temperature. The Infrared Thermostat Control will then shut off the furnace before the desired threshold level has been reached. The primary benefit of this predictive process is to turn off the furnace at an earlier time which results in energy saving. The secondary benefit is to minimize the room temperature overshoot.

A similar energy saving is effected in afternoon or early evening when the room air temperature drops below the threshold level. If the infrared sensor continues to measure sufficient heat flow into the room, the furnace "turn on" time is delayed until the room temperature and the heat flow drop to a selected delay threshold.

In another aspect of the invention the entire Infrared Thermostat Control system can be placed in a "summer" mode to control air conditioning in a manner similar to the heating system.

As the heat flow from outer walls and windows is sensed, the flow may be such that the engaging of the air conditioning system may be delayed because the day is cloudy.

A similar energy saving is effected in the afternoon or early evening wherein the outside air temperature starts to drop or the solar loading decreases because of clouds. If the infrared sensor continues to measure a decreased heat flow into the room, the air conditioning "off time" can be advanced resulting in an energy saving.

BRIEF DESCRIPTION OF THE DRAWINGS

FIG. 1 is a block diagram of the Infrared Thermostat Control as applied to an existing environmental control system.

FIG. 2 is an enlarged vertical cross-sectional view of an infrared detector with thermocouple.

DESCRIPTION OF THE PREFERRED EMBODIMENTS

Figure 3:
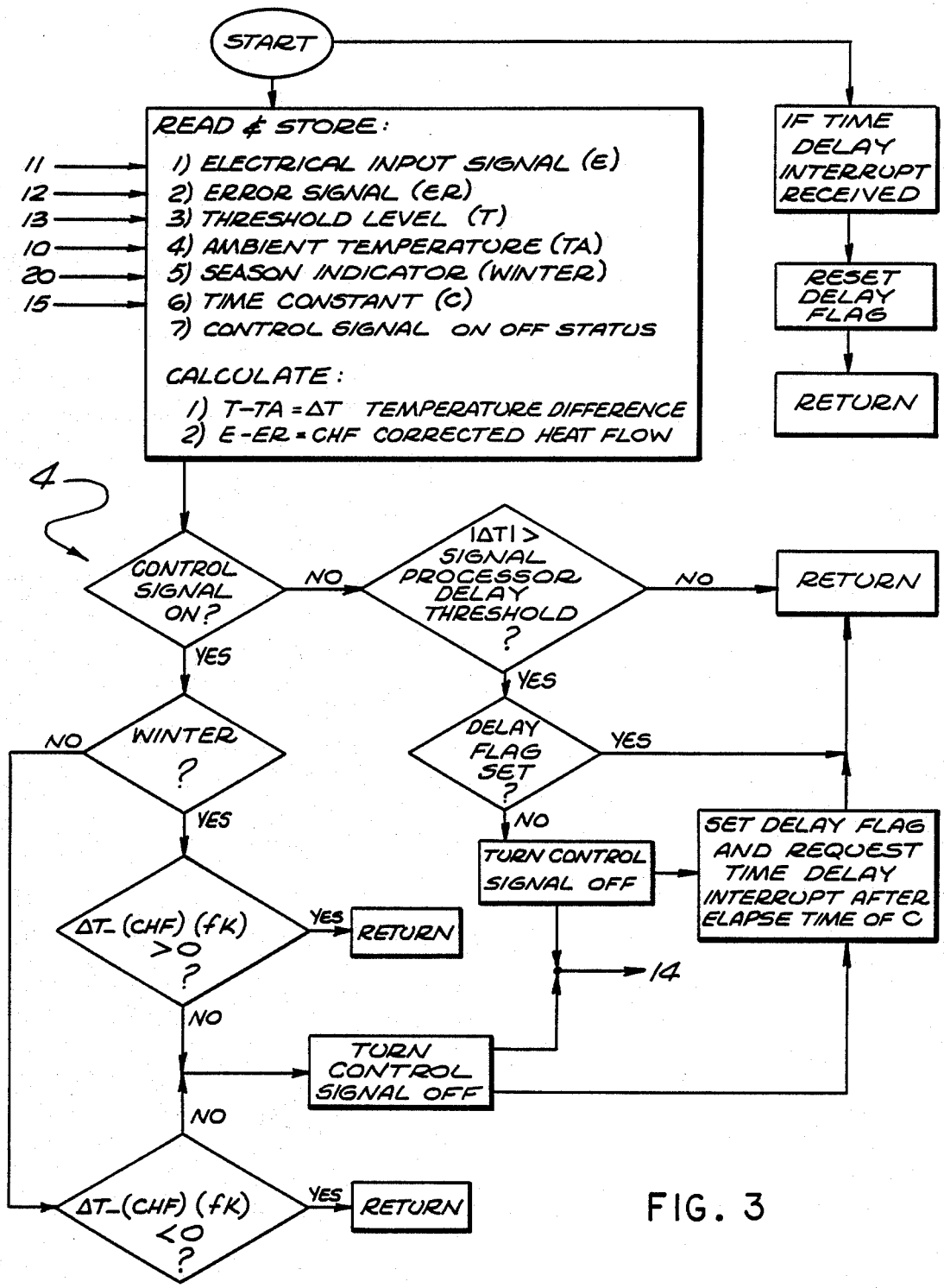
FIG. 3 is a flow diagram of the signal processor.

FIG. 1 illustrates all of the essential elements of an Infrared Thermostat Control 9 as constructed in accordance with the present invention. An ambient temperature sensor 3 provides continuous indication of ambient temperature signal 10 to the signal processor 4. Depending upon the size of the building, it may be desirable to include a plurality of ambient temperature sensors 3 located at critical points around the installation and providing input to some form of averaging device, e.g. an operational amplifier averaging circuit, the output of which is then applied as the overall ambient temperature signal 10 to the signal processor 4.

An infrared heat flow sensor 1 provides electrical input signal 11 which is indicative of the heat flow through the building walls and windows 8 within the field of view of the infrared heat flow sensor 1. The field of view of the infrared heat flow sensor 1 may be modified a shown in FIG. 2 by selecting the lens 17 appropriate for the placement of the Infrared Thermostat Control 9 and the building configuration. The lens 17 is supported over the infrared sensor 16 by a tube 18. The electrical input signal 11 is applied to the signal processor 4. The changes in ambient temperature can cause an error in the measurement of heat flow by the infrared sensor 16 due to the infrared sensor 16 seeing the inside walls of the tube 18 and some radiation from the lens 17. After some time at the new ambient temperature, the infrared sensor 16 and the inside walls of the tube 18 and lens 17 reach the same temperature and no error signal is generated. A thermocouple 2 placed between the infrared sensor 16 and the tube 18 provides error signal 12 indicative of the temperature deference between the walls of the tube 18 and the infrared detector 16 for input to the signal processor 4.

The signal processor 4 utilizes the error signal 12 to generate a signal proportional to the difference in temperature between the walls of the tube 18 and the infrared detector 16. This error signal 12 is added by the signal processor 4 to the electrical input signal 11 applied to the signal processor 4.

The thermostat 5 provides an input to the signal processor 4 indicative of the desired threshold level 13 for the environmental control system 7 to attain.

The season indicator 19 provides season indicator signal 20 which is indicative of which part of the environmental control system 7 the signal processor 4 should control, the furnace or the air conditioning equipment.

The signal processor 4 accepts the desired threshold level 13 from the thermostat 5 and compares it to the ambient temperature signal 10 from the ambient temperature sensor 3. If the season indicator 19 directs control of the furnace and the ambient temperature signal 10 is less than the threshold level 13 the processor 4 interprets the electrical input signal 11 information from the infrared heat flow sensor 1 as corrected by the error signal 12 from the thermocouple 2. If the corrected heat flow combined with the difference in temperature indicates that the corrected heat flow is capable of raising the room temperature to the threshold level 13 temperature then the signal processor 4 will output a control signal 14 to turn off the furnace in the environmental-control system 7.

The signal processor 4 will continuously monitor the corrected heat flow and the difference between the threshold level 13 and the ambient temperature signal 10. When the signal processor 4 predicts that the corrected heat flow is not sufficient to reach or maintain the threshold level 13 temperature without going below the signal processor's delay threshold, the signal processor 4 will provide a control signal 14 to turn on the furnace in the environmental control system 7.

To avoid turning the environmental control system 7 on or off shortly after it has been turned off or on, the signal processor 4 will utilize a time constant 6 input 15. The signal processor 4 will wait the time specified by the time constant 6 after sending a control signal 14 to the environmental control system 7 before sending another control signal 14 to it.

During the summer the season indicator 19 will be set to direct the signal processor 4 to control the air conditioning equipment. In this case the function of the signal processor 4 is similar to the winter function. The signal processor 4 will interpret the corrected heat flow to determine if the corrected heat flow will cause the internal ambient air temperature to rise beyond the threshold level 13 dictated by the thermostat 5 and the signal processor's delay threshold. If it will not, then the signal processor 4 will output a control signal 14 to turn off the-air conditioning equipment in the environmental control system 7.

FIG. 3 depicts the signal processor 4 logic flow described above. In processing the signals, the signal processor calculates a predetermined level based upon a preselected function, (fK), which is dependent upon the building size and configuration and upon the characteristics of the infrared sensor 16 selected for the Infrared Thermostat Control 9. The signal processor 4 delay threshold is selected to be compatible with the 27 selected threshold level 13 and human comfort perception which is dependent upon the average humidity for the location where the Infrared Thermostat Control 9 is installed.

Since certain changes may be made in the above apparatus without departing from the scope of the invention herein involved, it is intended that all matter contained in the above description or show in the accompanying drawings shall be interpreted in an illustrative and not in a limiting sense.

What is claimed is:

1. A system for automatically controlling the temperature within an enclosed building having an environmental control system, which has at least a heater and/or air conditioning equipment, and at least one wall exposed to external thermal energy comprising:
   (A) means responsive to the flow of thermal energy through the wall into the enclosed building for providing an electrical input signal;
   (B) means responsive to the internal ambient air temperature of the building for providing an ambient temperature signal;
   (C) means for processing the electrical input signal and the ambient temperature signal for providing a control signal;
   (D) means to set the threshold level for the control signal;
   (E) means for switching on and off the building environmental control system in response to the control signal.

2. A temperature control system as defined in claim 1 wherein the means for processing the electrical input signal and the ambient temperature signal also includes a time delay network to delay the output of the control signal.

3. A temperature control system as defined in claim 2 wherein the means for providing the electrical input signal comprises an infrared sensor.

4. A temperature control system as defined in claim 3 wherein the infrared sensor is provided with a means for compensating the infrared sensor signal for items other than the wall in the field of view of the infrared sensor.

5. A temperature control system with infrared sensor as defined in claim 4 wherein the means for compensating the infrared sensor comprises:
   (A) a thermocouple to generate an error signal proportional to the difference in temperature between the infrared sensor and the means that compensates the infrared sensor;
   (B) means for adding the error signal to the electrical input signal.

6. A temperature control system as defined in claim 5 wherein the means for processing responds to the means to set the threshold level to provide a control signal for switching off the heater when the heat flow rises to a predetermined level for the ambient temperature, and a control signal for switching on the heater when the heat flow falls to a predetermined level for the ambient temperature.

7. A temperature control system as defined in claim 5 wherein the means for processing responds to the means to set the threshold level to provide a control signal for switching on the air conditioning system when the heat flow rises to a predetermined level for the ambient temperature, and a control signal for switching off the air conditioning system when the heat flow falls to a predetermined level for the ambient temperature.

* * * * *